Aug. 24, 1937.　　　　L. M. STUART　　　　2,091,022
FRICTION TESTING APPARATUS
Filed Oct. 19, 1934

INVENTOR
Lemuel M. Stuart
BY
Walter J. Gill
HIS ATTORNEY

Patented Aug. 24, 1937

2,091,022

UNITED STATES PATENT OFFICE 2,091,022

FRICTION TESTING APPARATUS

Lemuel M. Stuart, Brooklyn, N. Y., assignor to Ford Instrument Company, Inc., Long Island City, N. Y., a corporation of New York Application October 19, 1934, Serial No. 749,035

7 Claims. (Cl. 265—10)

This invention relates to testing apparatus and more particularly to apparatus for determining the friction between the relatively movable elements of a device, such as a ball bearing.

It is an object of the invention to provide an apparatus which while of relatively simple construction is adapted to give indications of the quantity to be determined with the degree of accuracy required in order to show whether or not the device being tested is sufficient for its intended purpose.

In general the apparatus consists of a member adapted to be attached to one of the two elements the friction between which is to be determined, an indicating member mounted for movement relative to the first member and a resilient connection between the members by which a torque may be applied between them as a measure of the friction existing between the elements of the device which is being tested.

The particular nature of the invention, as well as other objects and advantages thereof, will appear most clearly from a description of certain preferred embodiments as shown in the accompanying drawing in which Fig. 1 is a perspective view of the apparatus;

Figure 1:
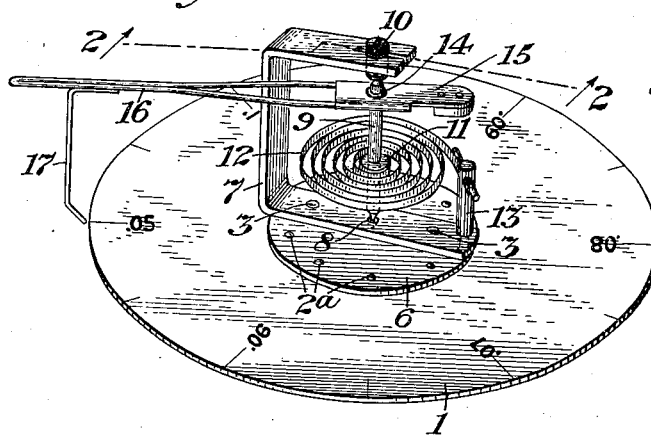

In the drawing 1 indicates a disk provided with graduations indicating different values of the quantity in which the torque applied by the spring is measured, as for instance, in inches—ounces. A plate 2 is attached by rivets 2a to the bottom of the disk 1. The plate 2 is formed with a tubular projection 4 which is provided with slots 5. A plate 6 is placed upon the top of disk 1 against which it is held by the rivets 2a. Screws 3 extend through the plate 2, the disk 1 and the plate 6 and are threaded into a lower horizontal arm of a U-shaped frame 7. This arm of the frame is provided with a recess 8 which serves as a bearing for the lower end of a spindle 9, the upper end of which enters a similar recess in a screw 10 which is threaded in the upper horizontal arm of the frame 7.

A collar 11 is attached to the spindle 9 and serves as a point of attachment for one end of a coil spring 12, the other end of which is attached to a post 13 affixed to the lower horizontal arm of frame 7. The spindle 9 is provided with another collar 14 carrying a plate 15 to which is attached a pointer 16 having a depending portion 17 terminating at the edge of the disk 1. The plate 15 carries a weight 18 to counterbalance the weight of the pointer 16 and its depending portion 17. The pointer 16 is normally held against the vertical portion of frame 7 by the spring 12.

Figure 2:
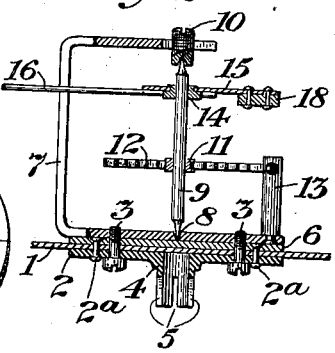
Fig. 2 is a view of a portion of the apparatus partly in elevation and partly in section along the line 2—2 of Fig. 1.

In the embodiment of the invention disclosed in Figs. 1 and 2, the depending portion 17 normally reads against the graduation on the disk 1 representing a value of .05 of the quantity in which the torque of the spring 12 is measured. This means that values of torque less than this particular value are negligible in so far as that represents the friction between the elements of the device to be tested. In other words, if the friction is less than that corresponding to this minimum value, the device will be satisfactory for its intended purpose.

In the operation of the embodiment of the invention disclosed in Figs. 1 and 2, the projection 4 will be attached to one of the movable elements of the device to be tested, which, for instance, may be a ball bearing. The mode of attachment may be by means of a shaft attached to one race of the bearing, the other race being held fixed substantially in the manner shown in Fig. 3 with a clamp to insure a tight connection between the projection and the shaft, as will subsequently be described in detail.

With the apparatus arranged as described above, the pointer 16 will be turned away from its normal position wherein the depending portion 17 coincides with the .05 graduation of the disk 1. The turning of the pointer will, through its connection to the spring 12, wind up the latter until the torque thus applied to the post 13 will be sufficient to overcome the static friction between the relatively movable elements of the ball bearing. When this occurs the race of the ball bearing which is attached to the shaft will turn with respect to the other race and the disk 1 will correspondingly turn since it is also connected to the shaft. The depending portion 17 of the pointer will then occupy a position relatively to the disk 1, which, as indicated by the corresponding graduation on the disk, will show the torque required to overcome the friction of the bearing as expressed in the particular units selected for this purpose.

In general, the static friction between two relatively movable objects is greater than the dynamic friction between them. This means that a greater torque must be produced by the spring 12 to cause the initial relative motion between the elements of the ball bearing than that which is required to continue such relative movement after the initial friction has been overcome. In accordance with this principle the indicated value of the initial torque required to produce the relative movement will be greater than the indicated value of the torque required to continue the relative movement.

As another illustration of a specific use of the apparatus disclosed in Figs. 1 and 2, reference may be made to determining the friction in a transmitting or receiving unit of a self synchronous electrical transmission system. In general such a unit includes a stator within which is mounted, by means of ball bearings, a rotor which is energized from an external circuit by means of fixed brushes bearing upon slip rings carried by the rotor. The rotor shaft normally carries a dial for indicating the movements of the rotor.

In using the apparatus of Figs. 1 and 2, the dial will be removed from the unit to be tested and the disk 1 will be attached to the shaft of the rotor. The pointer 16 will then be turned until sufficient torque is produced by spring 12 to cause the rotor to turn with respect to the stator. In this case the required torque is a measure of the total friction in the unit and includes not only the friction in the ball bearing but the friction due to the brushes and the slip rings in engagement with it.

Figure 3:
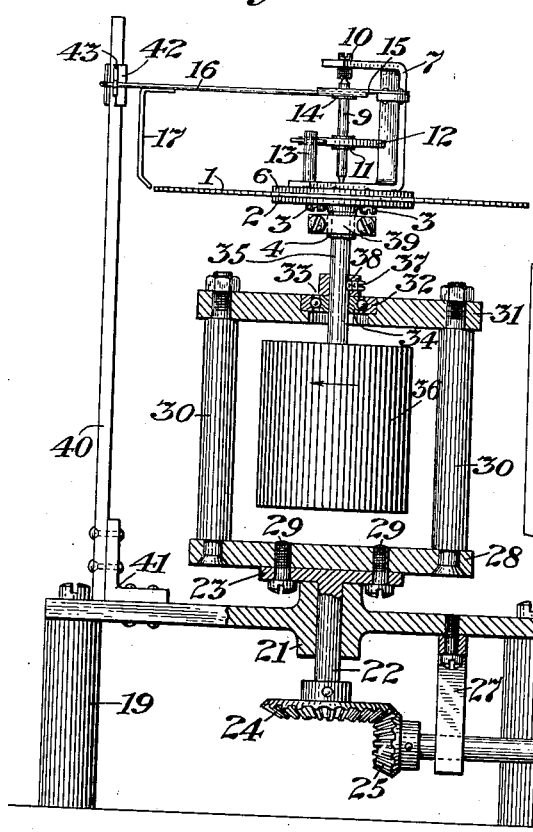
Fig. 3 is an elevation partly in section, showing one mode of application of the apparatus to a device to be tested.
Figure 4:
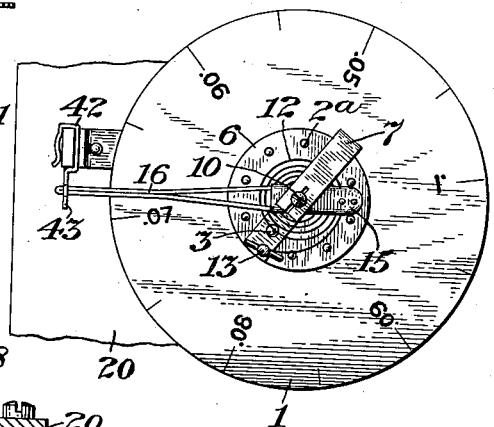
Fig. 4 is a plan view of the upper part of the apparatus shown in Fig. 3.

Referring now to Figs. 3 and 4 which show an application of the apparatus described above for testing the friction in a ball bearing by means of a substitutional device representative of an electrical transmitter or receiver, there is provided a frame consisting of a pair of standards 19 carrying a horizontal plate 20. This plate is provided with a hub 21 for a shaft 22 which is expanded at its upper end to form a plate 23. The lower end of shaft 22 carries a bevel gear 24 engaging a similar gear 25 on the end of a shaft 26 mounted in a bracket 27 depending from the plate 20.

A plate 28 is fastened to the plate 23 by screws 29. Attached to the plate 28 are posts 30 which carry an upper plate 31 provided with a central recess for receiving the outer race 32 of a ball bearing indicated as a whole by 33. The inner race 34 of the ball bearing surrounds a shaft 35 but is not directly attached thereto. Attached to the lower end of the shaft 35 is a weight 36 representative of the rotor element of an electrical transmitter or receiver, the ball bearings of which are to be tested by the apparatus of this invention, before being applied to an actual transmitter or receiver.

Attached to the shaft 35 by means of a set screw 37 is a collar 38 the lower face of which rests upon the inner race 34 of the ball bearing. This collar holds the weight 36 in place and on account of the relatively greater friction between the collar and the race as compared with the friction between the movable parts of the ball bearing, the inner race is in effect directly connected to the shaft 35. The upper end of the shaft 35 enters the slotted tubular projection 4 of the apparatus within which it is firmly held by means of a clamp 39. A standard 40 is attached to the plate 20 by a bracket 41. The standard carries a clip 42 having an extended portion 43 provided with a slot for receiving the end of pointer 16 under certain conditions of operation as will hereinafter appear.

In the operation of the modification shown in Figs. 3 and 4, the shaft 26 is driven by any suitable source of power and through gears 25 and 24, the shaft 22, plates 23 and 28, posts 30 and plate 31, the outer race 32 of the ball bearing will be correspondingly turned. Due to the static friction existing in the ball bearing, the inner race 34 tends to turn with the outer race carrying with it the shaft 35 by virtue of the friction existing between the inner race 34 and the collar 38 as previously explained.

As a result of the movement imparted to the shaft 35 the disk 1 will be correspondingly turned. Since the pointer 16 is connected to the standard 40 by clip 42, the spring 12, which is connected between the disk 1 and the pointer 16 will be placed under tension and thereby develop a torque which will tend to oppose the rotation of the shaft 35. When this torque is sufficient to overcome the friction in the ball bearing, the shaft 35 and disk 1 will cease to rotate. The value of the torque required to produce this result will be indicated by the reading of the depending portion 17 of the pointer 16 against the graduations on the disk 1.

As in the case of the operation of the embodiment of the invention shown in Figs. 1 and 2, the torque required to overcome the static friction of the ball bearing will ordinarily be greater than that required to overcome the dynamic friction during the subsequent relative movement between the elements of the ball bearing. Accordingly, after the initial indication of the torque required to overcome the static friction has been obtained, a lesser value of torque will be indicated than that which represented the dynamic friction.

By virtue of the apparatus described above, the friction between the relatively movable elements of the ball bearings intended for use in an electrical transmitter or receiver, may be individually determined, as explained in connection with Figs. 3 and 4, preliminary to placing these bearings in the actual device in which they are to be used. As explained in connection with Figs. 1 and 2, the total friction between all of the relatively movable elements of the assembled device may be determined.

While certain preferred embodiments of the invention have been illustrated and described, it will be understood that various changes may be made without departing from the principle of the invention as defined in the appended claims.

I claim:—

1. In apparatus for determining the friction between the relatively movable elements of a ball bearing, the combination of a rotatably mounted shaft, a member connected to the shaft and adapted to receive one race of the ball bearing to be tested, a shaft passing through the member and operatively connected to the other race of the ball bearing, a member attached to the second shaft, a frame mounted upon the second mentioned member, a spindle mounted on the frame and a resilient connection between the second mentioned member and the spindle.

2. In apparatus for determining the friction between the relatively movable elements of a ball bearing, the combination of a support, a shaft rotatably mounted in the support, a member connected to the shaft and adapted to receive one race of the ball bearing to be tested, a shaft passing through the member and operatively connected to the other race of the ball bearing, a member attached to the second shaft, a frame mounted upon the second mentioned member, a spindle mounted on the frame, a resilient connection between the second mentioned member and the spindle, a part attached to the spindle, a standard attached to the support and means on the standard for detachably connecting the part to the standard.

3. In apparatus for determining the friction between the relatively movable elements of a ball bearing, the combination of a support, a shaft mounted in the support, means for rotating the shaft, a member connected to the shaft and adapted to receive one race of the ball bearing to be tested, a shaft passing through the member and operatively connected to the other race of the ball bearing, a weight connected to the lower end of the second shaft, a disk means connected to the upper end of the second shaft, a member pivotally mounted upon the disk means, an indicator attached to the pivotally mounted member, a resilient member connected at one end to the pivotally mounted member and at the other end to the disk means, a standard attached to the support and means on the standard for detachably connecting the indicator thereto.

4. In apparatus for determining the friction between two relatively movable elements of a device, the combination of a member provided with graduations representing values of the quantity in which the friction between the elements is expressed, means for attaching the member to one of the elements, a U-shaped frame having one arm attached to the member, a spindle mounted between the arms of the frame, an indicator attached to the spindle and readable against the graduations on the member, a part associated with the frame and a resilient element connected between the spindle and the part for normally holding the indicator against the frame.

5. In a mechanism for determining the friction of a bearing, the combination comprising a graduated dial, means for securing the dial to a shaft for rotation therewith, a frame mounted on the dial for rotation therewith, a spindle rotatably mounted in the frame, an arm secured to said spindle and extending radially thereof, a spiral spring connecting the spindle and the dial and normally holding the arm against the frame, and an indicator on the arm for indicating the relative angular movement between the arm and the dial.

6. In a mechanism for determining the friction of a bearing, the combination comprising a graduated dial, means for securing the dial to a shaft for rotation therewith, a U-shaped frame mounted on the dial, a spindle rotatably mounted on the frame on center points coaxially with the dial, an arm extending radially of the spindle and secured thereto, a spiral spring connecting the spindle and the dial and normally holding the arm against the frame, and an indicator on the arm for indicating the relative angular movement between the arm and the dial.

7. In a mechanism for determining the friction of a bearing, the combination comprising a support, a shaft rotatably mounted in the support, means for rotating the shaft, a bearing support mounted on the shaft adapted to receive the outer race of a ball bearing, a shaft loose in said bearing support and adapted to be operatively connected to the inner race of a ball bearing, an inertia element connected to said second mentioned shaft, a dial mounted on said second mentioned shaft, a spindle rotatably mounted on the dial, resilient means connecting the dial and the spindle, and means for indicating relative angular movement between the dial and the indicator.

LEMUEL M. STUART.